No. 760,853. PATENTED MAY 24, 1904.
O. L. DILWORTH.
BRAKE FOR VEHICLES.
APPLICATION FILED JAN. 20, 1904.
NO MODEL.
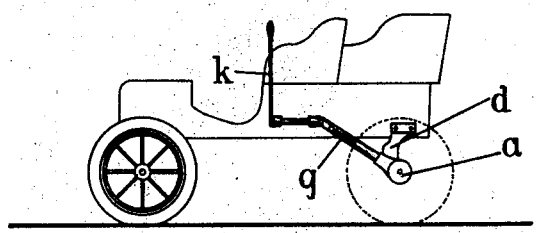
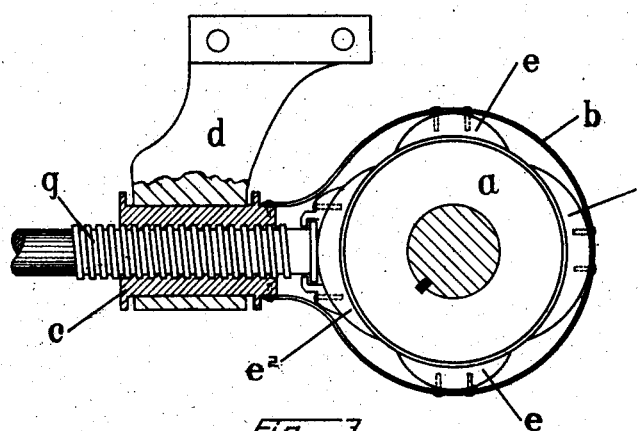
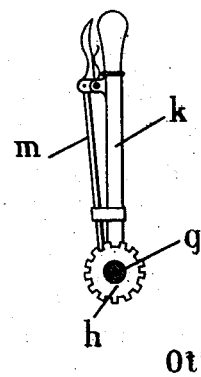
Witnesses
Frank S. Dilworth
May F. Ritchie
Otto L. Dilworth, Inventor,
Frank H. Allen
by
Attorney No. 760,853. Patented May 24, 1904.

UNITED STATES PATENT OFFICE.

OTTO L. DILWORTH, OF NORWICH, CONNECTICUT.

BRAKE FOR VEHICLES.

SPECIFICATION forming part of Letters Patent No. 760,853, dated May 24, 1904.

Application filed January 20, 1904. Serial No. 189,844. (No model.)

*To all whom it may concern:*

Be it known that I, OTTO L. DILWORTH, a citizen of the United States, residing at Norwich, in the county of New London and State of Connecticut, have invented a new and useful Improvement in Brakes for Vehicles, of which the following is a specification.

This invention has for its object the production of a simple, powerful, and reasonably-cheap form of brake and devices for operating the same, my improved form of brake being specially suitable for use with automobiles and the like vehicles.

My improvements are illustrated in and by the accompanying sheet of drawings, in which—

Figure 1 is an outline side view of an automobile having a brake of my improved form attached thereto. Fig. 2 is a relatively enlarged view of the brake proper and of the screw and nut by means of which the said brake is controlled, the said nut being shown in central longitudinal section. In Fig. 3 I have illustrated the lever and clutch by means of which the said screw may be rotated to apply or release the brake.

Referring to the drawings, the letter $a$ indicates a disk that is fixedly secured to the rear axle of the vehicle, as seen in Fig. 1 of the said drawings. Inclosing the disk $a$ is a strap $b$, preferably of spring-steel, whose ends are secured to a nut $c$, that is mounted in a bracket $d$. Between the disk $a$ and the strap $b$ are interposed brake-shoes $e\ e\ e'$, that are riveted or otherwise secured to the said strap, and upon that side of disk $a$ adjacent to the nut $c$ is a similar shoe $e^2$, that is slotted to receive a T-shaped head on the end of a screw $g$, that coacts with the said nut, as will be best understood by reference to Fig. 2. Preferably the nut $c$ is square or otherwise angular in cross-section, so that it cannot rotate in the bracket $d$. When the screw is rotated within the nut $c$, it will be obvious that the shoe $e^2$ will first be forced into frictional engagement with the disk $a$, and continued rotation of the screw will slide the nut longitudinally in its (bracket) support, thus causing the connected strap to force the shoes $e\ e\ e'$ into close engagement with the disk.

In order to rotate the screw-rod $g$, I have secured to its free end a notched disk $h$ and have hinged on said rod adjacent to the said notched disk a lever-arm $k$. Mounted to slide in suitable bearings on the lever-arm $k$ is a clutch-rod $m$, whose lower end is adapted to engage either of the notches in disk $h$. Rod $m$ serves to clutch together the screw-rod $g$ and lever-arm $k$, so that rocking motion given to the said lever-arm will be imparted to the screw-shaft to set up the brake-shoes in the manner above described, and I find by practical experiment that with a very coarse screw-thread only a slight rotary movement of the screw-shaft is necessary to set up the brake-shoes sufficiently.

Having thus described my invention, I claim—

1. In combination, with a disk, a strap inclosing said disk, brake-shoes between the disk and strap, and means consisting of a screw and nut substantially as set forth, for operating the said strap to force the brake-shoes into engagement with the said disk.

2. In combination with a disk, a nut, a strap secured to said nut and inclosing the said disk, brake-shoes interposed between the said strap and disk, a screw coöperating with the nut, and a brake-shoe mounted upon the end of said screw, all being substantially as described.

In testimony whereof I have signed my name to this specification in the presence of two subscribing witnesses.

OTTO L. DILWORTH.

Witnesses:
FRANK H. ALLEN,
MAY F. RITCHIE.